United States Patent [19]
Bainter et al.

[11] 3,969,868
[45] July 20, 1976

[54] INSULATION STRUCTURE

[75] Inventors: Huston K. Bainter; Marvin E. Nerem, both of Forest City, Iowa

[73] Assignee: Winnebago Industries, Inc., Forest City, Iowa

[22] Filed: Oct. 10, 1974

[21] Appl. No.: 513,531

Related U.S. Application Data

[60] Division of Ser. No. 173,234, Aug. 19, 1971, Pat. No. 3,909,995, which is a continuation of Ser. No. 15,602, March 2, 1970, abandoned, which is a continuation-in-part of Ser. No. 777,934, Sept. 9, 1968, abandoned, which is a continuation of Ser. No. 536,058, March 21, 1966, abandoned.

[52] U.S. Cl. ................................... 52/622; 52/309; 52/615; 52/631; 428/167
[51] Int. Cl.² ........................ E04C 2/22; E04C 2/24
[58] Field of Search ............. 52/631, 309, 615, 613, 52/71, 622; 138/143, 118, 149; 428/163, 167

[56] References Cited
UNITED STATES PATENTS

| | | | |
|---|---|---|---|
| 1,630,858 | 5/1927 | Meyercord | 52/631 |
| 1,734,209 | 11/1929 | Huffine | 138/149 |
| 2,181,164 | 11/1939 | Alexander | 52/631 |
| 2,556,884 | 6/1951 | Muller | 52/622 X |
| 2,728,479 | 12/1955 | Wheeler | 52/631 |
| 2,857,931 | 10/1958 | Lawton | 138/149 X |
| 3,111,787 | 11/1963 | Chamberlain | 52/309 X |
| 3,117,902 | 1/1964 | Holzheimer | 428/167 X |
| 3,118,186 | 1/1964 | Moss | 52/71 |
| 3,195,079 | 7/1965 | Burton et al. | 138/143 |
| 3,203,144 | 8/1965 | Fuller | 52/615 X |
| 3,219,383 | 11/1965 | Nerem | 52/627 X |
| 3,312,585 | 4/1967 | Hamme | 52/309 X |
| 3,363,387 | 1/1968 | Schmidt | 52/631 X |
| 3,407,546 | 10/1968 | Yates et al. | 52/622 X |

FOREIGN PATENTS OR APPLICATIONS

| | | | |
|---|---|---|---|
| 1,326,654 | 4/1963 | France | 138/149 |
| 260,801 | 4/1949 | Switzerland | 52/631 |

OTHER PUBLICATIONS

Plastics July 1947 "Wood-to-Metal Adhesives", Thomas Perry p. 21–24.
Modern Plastics May 1954 "Popcorn Plastics" p. 103–105, 200.

*Primary Examiner*—Ernest R. Purser
*Assistant Examiner*—Leslie Braun
*Attorney, Agent, or Firm*—Burd, Braddock & Bartz

[57] ABSTRACT

A sandwich panel multi-sided structure mountable on a vehicle body, as a pick-up truck or trailer. The structure is formed from a single flat sandwich panel comprising a bendable sheet metal facing and a rigid plywood facing bonded to opposite sides of a plastic foam core. The core is a compressible expanded polystyrene foam. The panel is provided with spaced pairs of transverse grooves extended through the rigid plywood facing toward the bendable metal facing. The grooves are along the corner sections and divide the panel into a roof section and opposite side sections. The side sections have openings for receiving window structures. The structure is formed by bending the sheet metal facing and compressing the core along the corner sections to form a roof converging outwardly and downwardly from a longitudinal ridge and upright side walls. The back of the pick-up cover is closed with an end wall having a door.

10 Claims, 6 Drawing Figures

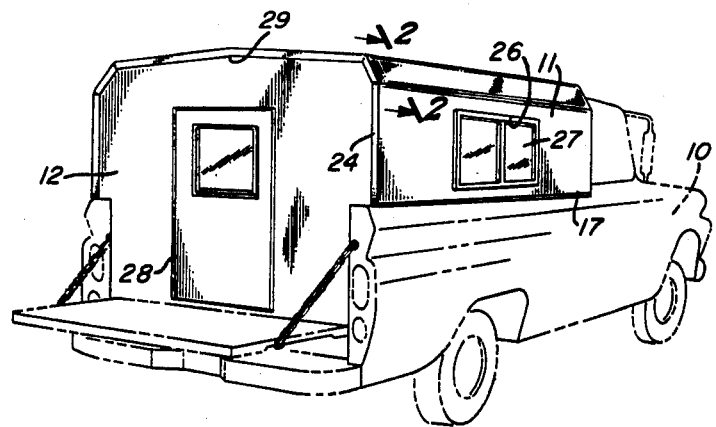
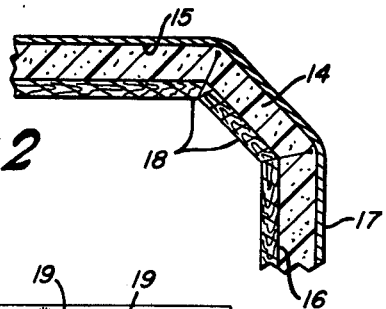
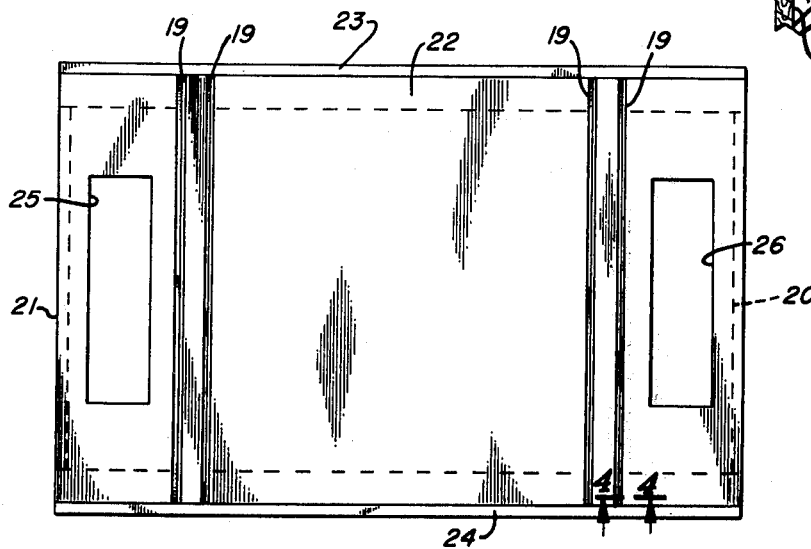
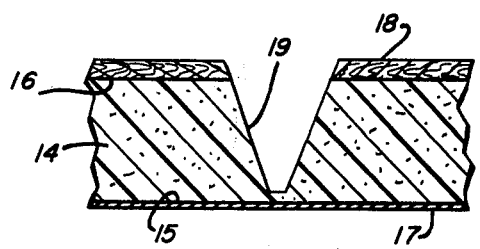

INSULATION STRUCTURE

CROSS REFERENCE TO RELATED APPLICATIONS

This application is a division of application Ser. No. 173,234, filed Aug. 19, 1971, now U.S. Pat. No. 3,909,995 Oct. 7, 1975, which is a continuation of Ser. No. 15,602, Mar. 2, 1970, abandoned which is a continuation-in-part of U.S. application, Ser. No. 777,934, filed Sept. 9, 1968, abandoned, which is is a continuation of U.S. application, Ser. No. 536,058, filed Mar. 21, 1966, now abandoned.

BACKGROUND OF INVENTION

Numerous types of structures have been fabricated to enclose tops of vehicle bodies. These structures are either fabricated at the site of mounting the structures on the vehicle body or are prefabricated into multi-sided structures and shipped to an assembly location. The fabrication of the multi-sided structures at the place of installation does not utilize mass production techniques to manufacture the structures. Completing the multi-sided structures at a manufacturing location and then shipping the structures to the points of distribution is not an economical transportation procedure, as the multi-sided structures utilize considerable transport space. Also, only a limited number of structures can be shipped in a single load. An example of this type of covering structure or top for a truck body is shown in U.S. Pat. No. 2,848,274.

Collapsible or knockdown structures have been used in the construction of vehicle body covers. These structures have panels that are connected to each other to form the complete cover. These panels require separate connecting structures and seals to hold the panels in assembled relation with each other. Examples of these types of pick-up covers are shown in U.S. Pat. No. 2,690,351 and U.S. Pat. No. 3,219,383.

SUMMARY OF INVENTION

The invention relates to a multi-sided structure or cover adapted to be mounted on the body of a pick-up truck. The cover has generally upright side wall sections and a center or roof section connected to the side wall sections with corners sections. All of the sections of the structure are formed from a single sandwich panel having a pliable outer facing and an inner rigid facing bonded to opposite sides of an expanded, compressible, plastic foam core. The longitudinal corner sections have both an outer pliable facing and core integrally joined with the outer facing and core of both the roof section and side wall sections.

In one form of the invention, the corner sections have closed longitudinal V-groove means in the inner facing and core separating the side wall sections from the roof section. The bottom of each V-groove means is spaced from the pliable outer facing, whereby the core in the corner section is continuous with the core of the roof section and side wall sections. The pliable outer facing, along with the core in the corner sections, has longitudinal bend portions generally parallel to the longitudinal V-groove means. The plastic foam core in the corner sections is bonded to the outer facing and compressed, thereby reinforcing the corner sections. The roof section has an upwardly directed longitudinal ridge, whereby the roof section converges upwardly from the corner sections.

An object of the invention is to provide a multi-sided structure which can be manufactured from panels that are shipped as single flat pieces in relatively large quantities and can be quickly and easily assembled into a finished cover with a minimum of time and labor. A further object of the invention is to provide the pick-up cover with a sandwich panel structure which has a longitudinal ridge or crown to compensate for changes in temperature without separating the outer skin from the foam plastic core or buckling the roof section. Also, another feature of the invention is to provide a pick-up cover that has reinforced longitudinal corner sections having an uninterrupted outer skin and compressed foam plastic core bonded to the outer skin. An additional feature of the invention is to provide the pick-up cover strength and thermo-insulating characteristics.

IN THE DRAWINGS

FIG. 1 is a perspective view of a pick-up truck shown in light lines with a multi-sided hollow structure of this invention mounted thereon;

FIG. 2 is an enlarged sectional view taken along the line 2—2 of FIG. 1;

FIG. 3 is a plan view of a sandwich panel cut and grooved but not formed and is drawn to the same scale as FIG. 1;

FIG. 4 is an enlarged fragmentary sectional view taken along the line 4—4 of FIG. 3 and is drawn to an even larger scale than FIG. 2;

Figure 5:
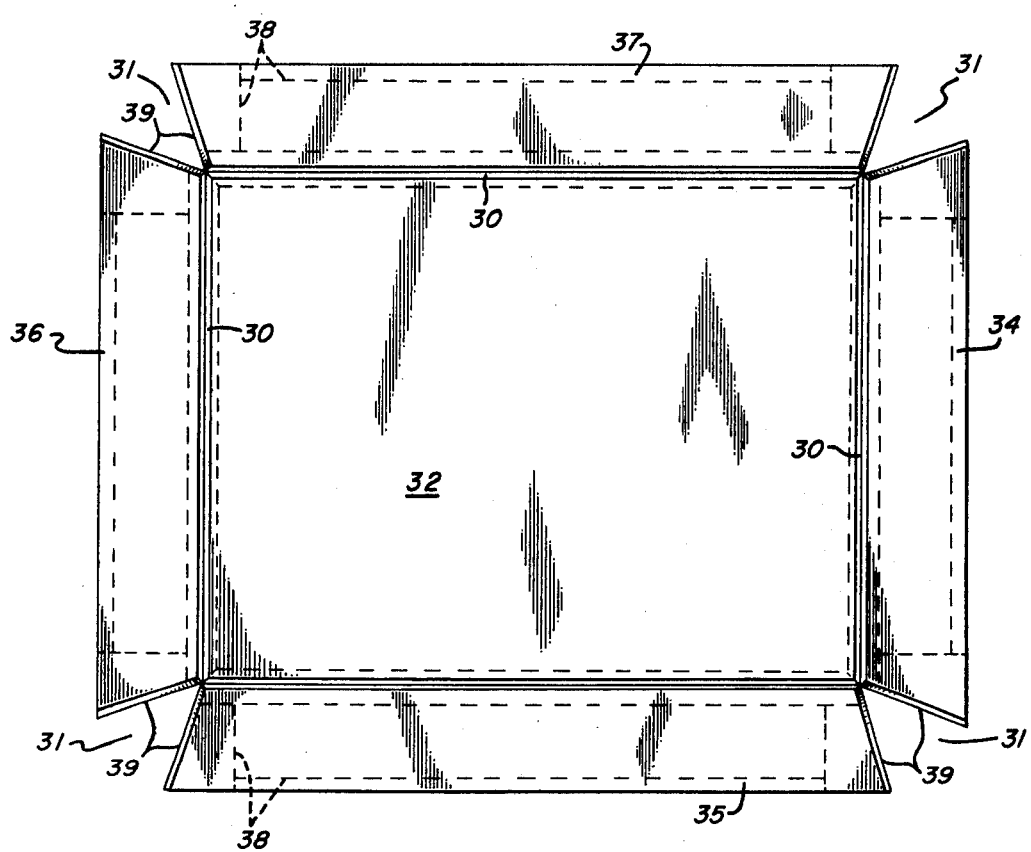
FIG. 5 is a different form of panel that has been both grooved and cut to produce a five-sided hollow device and drawn to substantially the same scale as FIG. 3.

Referring to the drawings, a practical use to which this invention may be put is in making what are known as covers and campers for trucks of the pick-up type such as shown at 10 in FIG. 1. Both sides, such as the one 11, and the roof of the cover or camper are constructed from a blank formed according to this invention. The end member 12 and a second end member fitting in the opposite end of the cover adjacent the cab of truck 10 complete the structure.

The portion of the cover including side 11, as shown in FIG. 3, is made flat in a single piece. Ends 12 and its counterpart, also being flat, enable the entire device to be shipped in a knockdown condition in a space no larger than two of the elements shown in FIG. 3 before it is bent into shape. At an ultimate destination, there is very little problem in bending the element, shown in FIG. 3, and assembling it to the two ends, such as the one 12 which makes the unit ready to be installed on a truck.

As is best seen in FIG. 4, the sandwich panel from which the elements of this invention are made comprises a core member, as shown at 14, secured to facing members 17 and 18. Bonding materials 15 and 16 may be similar or dissimilar to each other depending on a number of factors, such as the materials to be bonded and perhaps the use to which the panel will be put. At least one of the facing members, shown in FIG. 4 as facing member 17, must be pliable. That is to say, it must be material that is capable of being bent without fracturing. A specific example of an acceptable combination for a particular function is illustrated in FIGS. 1 to 4 as being a sandwich panel having a foam polystyrene core 14 with a first facing 18 of plywood and a second facing 17 of metal, as aluminum.

The panel shown in FIG. 3 is as wise as the structure shown on truck 10 in FIG. 1 is long. This panel is grooved, as shown at 19 in FIG. 4, the grooves extending transversely across the panel, as shown at 19 in FIG. 3. The broken lines represent the inserts of wood that may be inserted at the edges of the panel. As for example, at 20 there may be a railing of wood which would have a corresponding member 21 on the opposite side of the panel, shown in FIG. 3, to assist in securing the cover to the truck body. At each longitudinal edge are portions where the polystyrene core 14 has been cut back in order to leave a marginal edge 23 and 24 of uncovered sandwich panel facing 17.

The openings, shown at 25 and 26, may be used to install windows such as the ones shown at 27 in the member 11 of FIG. 1.

The grooves 19 divide the entire panel into a series of sections, including a center section 22, which are coupled together at least by the pliable facing 17. As shown in FIGS. 2 and 4, a portion of the polystyrene or other core materials of the sandwich panel may also continue to link the sections after grooving.

Panel 12 may be provided with an opening closed with a door such as the one shown at 28. The panel 12 also may be of a different elevation having one or more top portions with the top center, as shown at 29, being slightly higher than any other portions of the panel. The end member, adjacent to the cab of the truck 10, may be similarly formed in order to bend the top center of portion 11 or center section 22 into a sort of ridge pole effect. In other words, the center section 22 converges outwardly to the longitudinal ridge 29 which extends parallel to the closed V-grooves, as shown in FIGS. 1 and 2. This bending of the roof may alter both the appearance and the water sledding characteristics of the structure. It also tends to provide more rigidity to the otherwise completely flat roof portion of the portion 11.

The manner in which member 12 and member 11 are secured together is not of patentable importance and is not shown in detail, since it may be done in any one of a number of ways. Illustrated here, for example, the flap edges 23 and 24 may be used to secure the panel 12 and its corresponding opposite panel adjacent the cab to the portion 11, as shown in FIG. 1.

Figure 6:
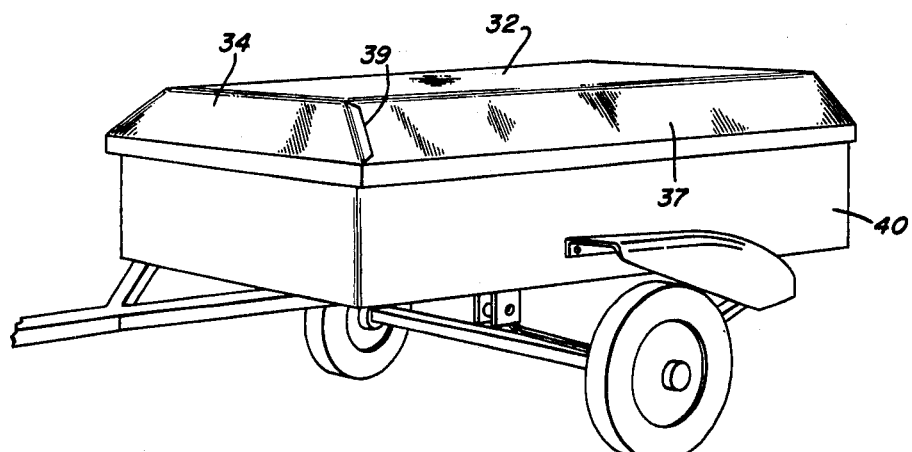
FIG. 6 is a perspective view of the blank in FIG. 5 formed into its ultimate shape.

In FIG. 5, it may be seen a panel generally similar to that shown in FIGS. 2, 3 and 4. The specific difference in this species resides in the fact that the panel has not only been grooved, as shown at 30, but it has also been cut, as seen at 31, whereby when force is applied to the various sections of the panel, illustrated in FIG. 5, it may assume the configuration shown in FIG. 6. In this manner, center 32 of the panel, shown in FIG. 5, is surrounded by a series of wings designated 34 through 37 in a clockwise direction around the center panel 32 and beginning at the right thereof. The broken lines in the figure, at 38 for example, mark out areas where the foam polystyrene or other core material of the paneling is replaced by a material that has greater tensile strength, as wood for example, for purposes of attaching hardware, such as hinges and the like, to the structure. When force is applied to the various wings 34, 35, 36 and 37, they may be bent with respect to the center panel 32 to form the multi-sided figure shown in FIG. 6. In this case, the panel is being used as a cover for the two wheeled trailer 40. As can be seen in FIG. 5, each of the openings or cuts 31 is bordered by uncovered edges or flanges of facing material. In each case, the pliable facing of the sandwich panel has been bared to leave flanges for attaching tabs 39 of the uncovered pliable sandwich board facing. These tabs are used in forming the corners of the multi-sided structure shown in FIG. 6. A cover member 32–35 may be hinged at either side or either end to the trailer box 40. Alternatively, it simply may be resting thereon with some kind of aligning members extending between the two to hold them in position. The cover is lifted off when it is desired not to cover the box 40. Obviously, the cuts 31 could be made substantially deeper and/or wider and change the configuration substantially. Also, the grooves 30 need not necessarily extend in a straight line on all four sides and this could produce an effect somewhat similar to that illustrated in FIG. 1 in the form of the device shown there. In each case, the critical fact is the combination of grooves in sandwich panels having at least one pliable face. These grooves extend from the face opposite the pliable face and leave unbroken, at least the pliable face. Bonding material is placed between all of the various facing members and core members in all of the figures, although not always illustrated.

In summary, the top and side walls of the pick-up cover are formed from a one-piece sandwich construction panel. This panel is fabricated in a flat form and cut and grooved prior to shipment to an erection location. This method of mass manufacturing and mass shipping of cover components results in substantial savings, reduced manufacturing time, less labor and lower transportation costs. The one-piece sandwich panel has a generally flat non-pliable rigid inner facing 18, as wood, plywood and the like. The outer facing 17 is pliable, as sheet metal, aluminum sheet and the like. Located between the facing is an expanded, plastic foam core 14. The core is identified as a foam polystyrene core. This type of material offers very low thermoconductivity, resistance to the transmission of water vapor and absorption of moisture, and resistance to relatively high static forces without deformation. Polystyrene foam has good compressive, flectual and sheer strengths. Compressive strength of polystyrene foam increases with the density of the foam. A polystyrene foam having a density of 1.5 to 2.5 pounds per cubic foot has a compressive strength of approximately 35 psi. When the density of the polystyrene foam is increased to 3.6 to 4.2 pounds per cubic foot, the compressive strength increases to 65 to 130 psi.

In the formation of the cover, the corner sections, as shown in FIG. 2, are bent longitudinally closing the V-grooves 19. The foam plastic material in the corner sections remains bonded to the pliable outer facing 17 and compresses along the bases of the grooves. The compression of the polystyrene core increases the strength of the material longitudinally along the corner sections of the panel. The core material in the corner sections is compressed and remains in the corners attached to the outer facing 17. The compressed core reinforces and insulates the corners adjacent the bends in the pliable outer facing 17.

The center or roof section 22, as shown in FIG. 1, has an upwardly directed longitudinal ridge 29 so that the roof section converges upwardly and outwardly from the opposite corner sections of the cover. The foam plastic core 14, being compressible or yieldable, compresses when the outer facing 17 shrinks to a cold temperature and expands when the outer facing is subjected to heat. The result is that the core 14 follows the outer facing 17 as it moves. The ridge portion or crown 29 compensates for temperature changes to keep the roof section at its desired shape. If the roof section 22 were flat, it would buckle and shrink down in cold temperatures. With an increase in temperature, the roof section would continue to buckle down and not return to its flat position. The upwardly directed longitudinal ridge 29 prevents this buckling of the roof section.

While there have been shown and described preferred embodiments of a multi-sided structure, it is understood that various changes in size and number of the sections may be made by those skilled in the art without departing from the invention.

The embodiments of the invention in which an exclusive property or privilege is claimed are defined as follows:

1. An insulation board structure comprising: a cellular plastic foam member having a first side and a second side, a continuous deformable first sheet member covering and secured to the first side of the foam member, adhesive means attaching the entire first side to the first sheet member, said foam member having a series of truncated, V-shaped grooves formed substantially through the thickness of the foam member, said grooves extending from the second side toward the first side, the apexes of said grooves being spaced from the first sheet member, said foam member being continuous adjacent the first sheet member, second sheet members covering the second side of the foam member between said grooves, adhesive means attaching the second side to the second sheet members, and rigid members located between said first and second sheet members adjacent opposite transverse edges of the sheet members, said rigid members having end surfaces used when the insulation board structure is installed.

2. The insulation board structure of claim 1 wherein: the second sheet member is of rigid material.

3. The insulation board structure of claim 1 wherein: said continuous deformable first sheet member extends beyond the ends of the grooves.

4. The insulation board structure of claim 1 including: second rigid members located between the first and second sheet members and adjacent the longitudinal sides of the foam member and means for securing the second rigid members to said first and second sheet members, said first sheet member extended outwardly from the second rigid members.

5. The structure of claim 4 wherein: said means for securing the second rigid members to said first and second sheet members comprises an adhesive material.

6. An insulation structure comprising: a cellular plastic foam member having a first generally flat side and a second generally flat side opposite the first side, a continuous deformable first sheet member located adjacent said first side, means securing said first sheet member to said first side, a rigid second sheet member located adjacent the second side, means securing the second sheet member to said second side, a series of truncated V-shaped grooves formed in said rigid second sheet member and the foam member, said grooves extending substantially through the rigid sheet member and through substantially the thickness of the foam member, said foam member being continuous adjacent the first sheet member, said first and second member having opposite ends and longitudinal edges, and rigid means located between said first and second sheet members adjacent the opposite ends of the first and second sheet members, said rigid means having end surfaces used when the insulation structure is installed.

7. The structure of claim 6 wherein: the first sheet member has edge portions that extend outwardly from opposite edge portions of the foam member.

8. The structure of claim 6 wherein: said first sheet member is an aluminum sheet member and said second sheet member is a plywood sheet member, said foam member is a polystyrene foam.

9. The structure of claim 6 including: at least one opening through said first sheet member, foam member and second sheet member.

10. The structure of claim 6 including: second rigid means located between the first and second sheet members adjacent the longitudinal edges of the sheet members, and means for securing the second rigid means to said first and second sheet members, said first sheet member extended outwardly from said second rigid means.

* * * * *

UNITED STATES PATENT AND TRADEMARK OFFICE
CERTIFICATE OF CORRECTION

PATENT NO. : 3,969,868
DATED : July 20, 1976
INVENTOR(S) : Huston K. Bainter et al It is certified that error appears in the above-identified patent and that said Letters Patent are hereby corrected as shown below:

Column 1, line 46, "corners" should be --corner--.

Column 2, line 16, after "cover", insert --with--.

Column 3, line 1, "wise" should be --wide--.

Column 3, line 35, "sledding" should be --shedding--.

Signed and Sealed this

Fourteenth Day of September 1976

[SEAL]

Attest:

RUTH C. MASON
Attesting Officer

C. MARSHALL DANN
Commissioner of Patents and Trademarks